L. E. UNDERWOOD.
DYNAMO ELECTRIC MACHINE.
APPLICATION FILED APR. 3, 1909.

960,449.

Patented June 7, 1910.

2 SHEETS—SHEET 2.

WITNESSES:
W. Ray Taylor.
J. Ellis Glen.

INVENTOR:
Louis E. Underwood
BY
ATTY

UNITED STATES PATENT OFFICE.

LOUIS E. UNDERWOOD, OF LYNN, MASSACHUSETTS, ASSIGNOR TO GENERAL ELECTRIC COMPANY, A CORPORATION OF NEW YORK.

DYNAMO-ELECTRIC MACHINE.

960,449.    Specification of Letters Patent.    Patented June 7, 1910.

Application filed April 3, 1909. Serial No. 487,683.

*To all whom it may concern:*

Be it known that I, LOUIS E. UNDERWOOD, a citizen of the United States, residing at Lynn, county of Essex, State of Massachusetts, have invented certain new and useful Improvements in Dynamo-Electric Machines, of which the following is a specification.

My invention relates to dynamo-electric machines and more particularly to the ventilation of such machines, and has for its object to provide a simple arrangement and construction of parts for this purpose.

The various features of novelty which characterize my invention are pointed out with particularity in the claims annexed to and forming a part of this specification. For a better understanding of my invention, however, and the advantages possessed by it, reference may be had to the following description, taken in connection with the accompanying drawings, in which—

Figure 1:
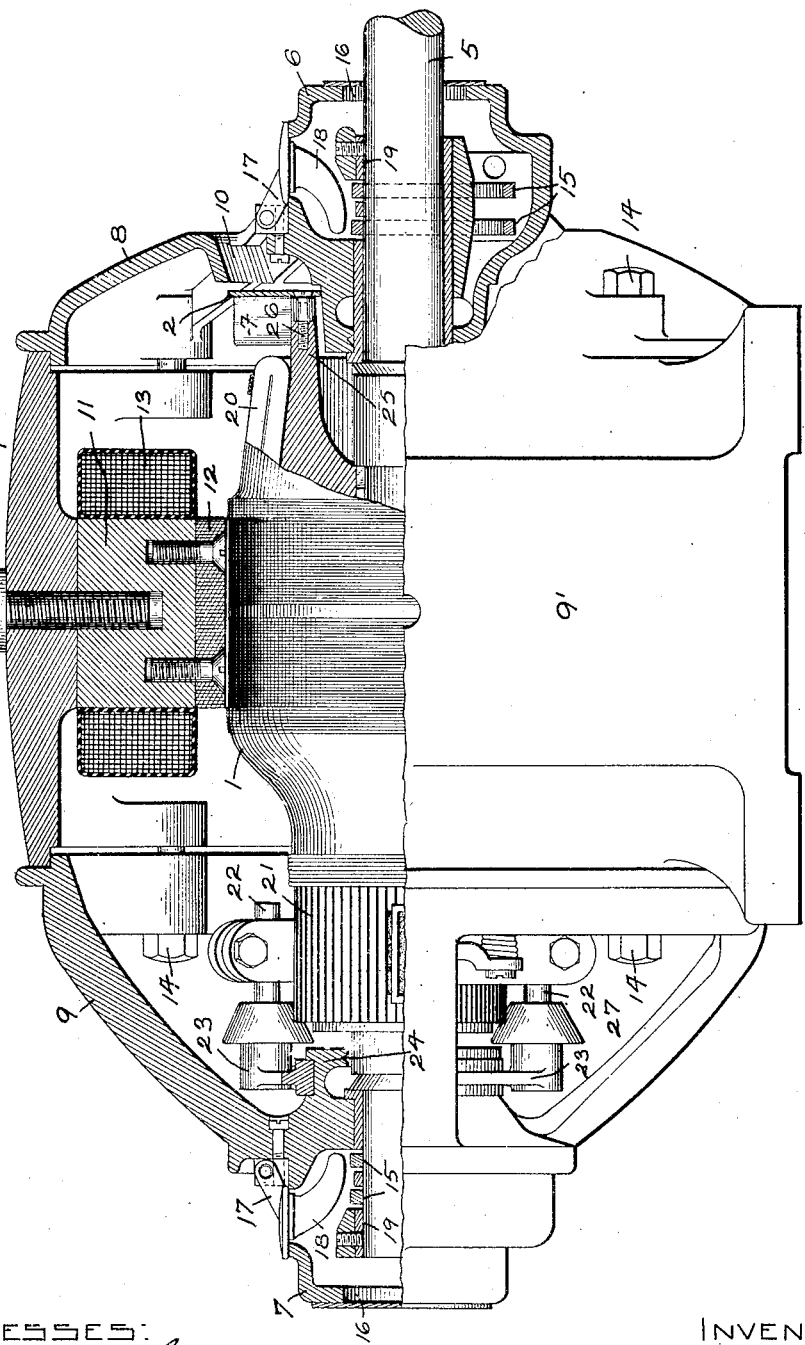
Figure 2:
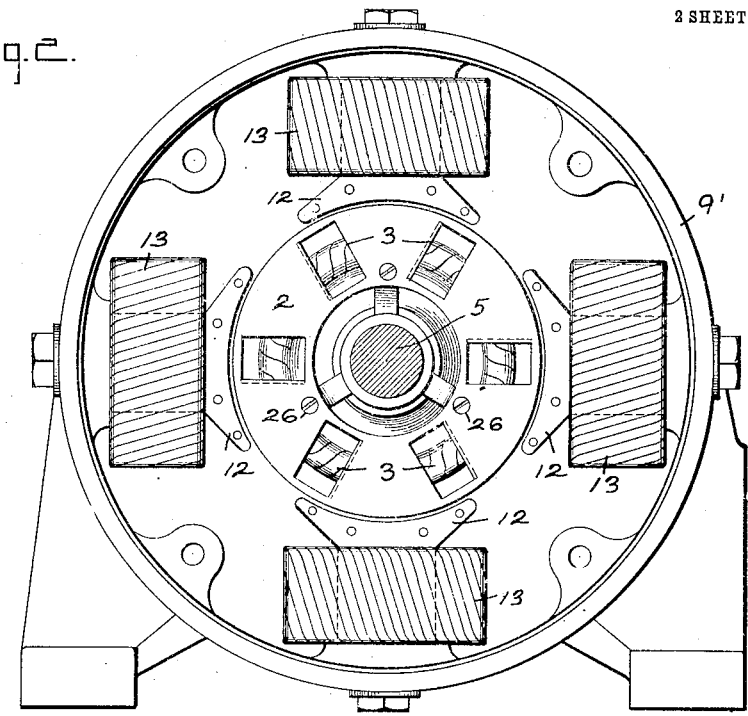
Figure 3:
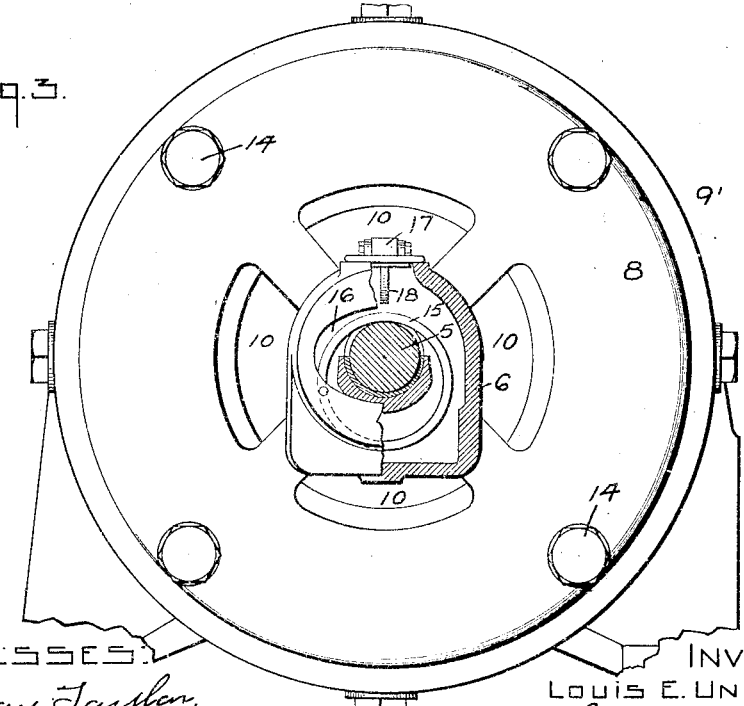

Figure 1 is a side elevation of a dynamo-electric machine embodying my invention, with parts broken away and in section; Fig. 2 is an end elevation of the machine in Fig. 1 with the end member removed; and Fig. 3 is an end elevation similar to Fig. 2 with the end member in place and partly in section through the bearing in the end member.

Referring to the drawings, the dynamo-electric machine has a rotatable member 1 to which is fastened a fan member comprising a disk 2 having openings 3 therein and fan blades 4 extending therefrom, the openings 3 being between the fan blades 4. The rotatable member 1 is mounted on a shaft 5 which is journaled in bearings 6 and 7 in the end members 8 and 9. The end members are fastened to the frame 9' of the dynamo-electric machine. The end member 8 has openings 10 around the shaft bearing 6 for conducting air to the openings 3 in the disk, the disk being close to and covering the openings 10.

The frame member 9' has bolted thereto, field poles 11 provided with laminated tips 12 and exciting coils 13. The end members 8 and 9 are fastened to the frame member 9' by means of bolts 14 passing through lugs on the end members. The bearings 6 and 7 are each provided with two solid rings 15 which are inserted through the elliptical holes 16 formed in the ends of the bearings. The bearing covers 17 each have a projecting lug 18, which, when the covers are down, extend over the rings and prevent them from jumping out of their grooves in the bearing linings 19. The winding 20 on the rotatable member is connected to a commutator 21. Brushes mounted on the studs 22 collect from the commutator. These studs are fastened to a ring 23 which is mounted on a projecting portion 24 of the bearing.

The rotatable member is provided with a spider which has a projecting flange portion 25, to which the fan member is fastened by means of screws 26. The flange portion projects over the bearing 6 and thereby the total length of the machine is decreased. I prefer to make the fan member out of sheet metal, punching the blades out of the body of the disk and then bending them so as to form radial blades. I may make the disk of substantially the same diameter as that of the rotatable member, as shown in the drawing, so that the rotatable member may be removed from within the field poles in either direction without disturbing the fan member.

The commutator end member 9 is practically open due to the openings 27 therein which are substantially of the same outside diameter as the inside diameter of the frame. The pulley end member 8 is closed except for the small openings 10 around the bearing 6. The outside diameter of these openings 10 is substantially the same as that of the disk 2.

The openings 10 are close to the disk 2 and conduct air to the openings 3 in the disk. By means of the fan blades 4 the air is forced against the armature windings 10 and the field spools 13 thereby cooling them, the heated air escaping through the openings 27 in the end member 9.

What I claim as new and desire to secure by Letters Patent of the United States, is—

1. In a dynamo electric machine, a frame member, an end member fastened thereto, a shaft, a rotatable member mounted thereon, said end member having a bearing in which said shaft is journaled and openings around the bearing, and a fan member comprising a rotatable disk mounted in close proximity to and covering the openings in said end member, fan blades extending from said disk on the inside thereof and openings in said disk between the fan blades and opposite to the openings in said end member.

2. In a dynamo electric machine, a frame member, an end member fastened thereto, a shaft, a rotatable member mounted thereon, said end member having a bearing in which said shaft is journaled and openings around the bearing, and a fan member comprising a sheet metal disk mounted in close proximity to and covering the openings in said end member, fan blades bent up out of said disk on the inside thereof and openings in said disks between the fan blades and opposite to the openings in said end member.

3. In a dynamo-electric machine, a frame member, an end member fastened thereto, a rotatable member mounted on a shaft and having a flange member, a fan fastened to said flange member comprising a disk having openings therein and fan blades extending therefrom, said end member having a bearing in which said shaft is journaled and over which said flange member projects and openings of substantially the same outside diameter as the diameter of the disk for conducting air to the openings in said disk.

4. In a dynamo-electric machine, a frame member, an end member fastened thereto, a rotatable member mounted on a shaft, a fan member fastened to said rotatable member comprising a sheet metal disk having openings punched therein and fan blades bent up out of said disk, said end member having a bearing in which said shaft is journaled and openings around the bearing for conducting air to the openings in said disk, said disk being in proximity to the openings in said end member.

In witness whereof, I have hereunto set my hand this first day of April, 1909.

LOUIS E. UNDERWOOD.

Witnesses:
 DUGALD McK. McKILLOP,
 FRANK G. HATTIE.